United States Patent [19]

Short

[11] 4,243,792

[45] Jan. 6, 1981

[54] MOISTURE CURING POLYURETHANE TOPCOAT PAINT WITH IMPROVED GLOSS STABILITY

[75] Inventor: William T. Short, Warren, Mich.

[73] Assignee: General Motors Corporation, Detroit, Mich.

[21] Appl. No.: 795,798

[22] Filed: May 11, 1977

[51] Int. Cl.$^3$ .............................................. C08G 18/38
[52] U.S. Cl. ........................................ 528/73; 528/59; 428/423.1
[58] Field of Search ......... 260/45.8 NH, 45.8 N (U.S. only),
only), 31.8 N, 32.8 N, 77.5 AM (U.S. only); 428/425; 528/73

[56] References Cited

U.S. PATENT DOCUMENTS

| 3,200,086 | 8/1965 | Coleman | 260/2 EP |
|---|---|---|---|
| 3,282,886 | 11/1966 | Gadecki | 260/45.8 NT |
| 3,351,608 | 11/1967 | Oertel et al. | 260/45.9 QA |
| 3,383,365 | 5/1968 | Tate et al. | 528/62 |
| 3,499,783 | 3/1970 | Nelson et al. | 428/161 |
| 3,640,928 | 2/1972 | Murayama et al. | 260/45.8 N |
| 3,936,409 | 2/1976 | Schroeder et al. | 260/32.8 N |
| 4,013,598 | 3/1977 | Evans et al. | 260/77.5 AM |
| 4,035,337 | 7/1977 | Herweh et al. | 260/77.5 AM |
| 4,052,351 | 10/1977 | Dix et al. | 260/23 H |
| 4,083,815 | 4/1978 | Thompson | 260/32.8 N |
| 4,102,870 | 7/1978 | Hofmann et al. | 528/73 |
| 4,136,090 | 1/1979 | Hoeschele | 260/860 |
| 4,145,512 | 3/1979 | Uhrhan et al. | 528/73 |
| 4,145,515 | 3/1979 | Pogozelski et al. | 260/32.8 N |

OTHER PUBLICATIONS

Saunders et al., Polyurethanes Chemistry and Technology, Part II, 1964, pp. 453, 462, 463, 477, 534 and 535.
Saunders et al., Polyurethanes Chemistry and Technology, Part I, 1962, pp. 63-65.
Noller, "Chemistry of Organic Compounds", 2nd Edition, 1957, p. 228.

Primary Examiner—Maurice J. Welsh
Attorney, Agent, or Firm—George A. Grove

[57] ABSTRACT

In a preferred embodiment, an improved moisture curing urethane resin that is durable in the presence of moisture and sunlight is formed by reacting an excess of a suitable aliphatic isocyanate with a suitable mixture of organic triols and diols and a hindered piperidine type stabilizer, e.g., bis(2,2,6,6 tetramethyl piperidinyl-4) sebacate in the presence of an organotin urethane forming catalyst such as dibutyltin dilaurate. This resin mixture product may be formulated with pigments, solvents and the like to form a topcoat paint that, upon application to a substrate, is curable under conditions of high relative humidity but relatively low temperatures (e.g., about 90° C.). The cured paint has excellent gloss stability due to the chemical incorporation of the stabilizer segments throughout the binder resin molecules.

5 Claims, No Drawings

MOISTURE CURING POLYURETHANE TOPCOAT PAINT WITH IMPROVED GLOSS STABILITY

This invention relates to moisture curable urethane paint binder resins that have excellent gloss stability when exposed to moisture and sunlight. More specifically, this invention relates to isocyanate terminated urethane prepolymer resins containing hindered piperidine type ultraviolet stabilizer segments distributed throughout the urethane molecules, which resins are moisture curable and advantageously employed in paint formulations such as automotive topcoat paints that are exposed to sunlight and moisture.

It is known that suitably formulated polyurethane resins are both tough and hard, yet flexible and resistant to impact and, therefore, could be considered as paint resins for applications such as automotive topcoats. They resist chipping and other mechanical failures. However, heretofore, polyurethane paint binder resins have not displayed adequate resistance to loss of gloss when exposed to moisture and sunlight. Previously, polyurethane resin based paints degraded and faded when exposed to outdoor conditions, becoming dull in appearance and otherwise unacceptable for commercial utilization.

Accordingly, it is an object of my invention to provide an improved polyurethane resin that is much less susceptible to degradation than existing urethanes when exposed to moisture and sunlight.

It is a further object of my invention to provide an isocyanate terminated, polyurethane prepolymer paint binder resin and method of making wherein the prepolymer contains in its molecular chains segments of a hindered piperidine type ultraviolet stabilizer. The stabilizer is thus permanently distributed in the polymer molecules it is to protect. The resulting resin mixture may be formulated with a relatively high loading of pigments and a relatively low solvent content into a one-component moisture curing topcoat paint formulation having excellent stability and durability when exposed to outdoor conditions.

It is another object of my invention to provide topcoat paint formulations, based on the above described polyurethane paint resins, having exceptional gloss stability and containing a relatively high solids content but which are readily sprayable or flowable onto a desired substrate and moisture curable thereon with efficient use of energy.

In accordance with a preferred embodiment of my invention, these and other objects are accomplished as follows. A moisture curable isocyanate terminated prepolymer binder resin mixture is prepared by mixing and coreacting appropriate amounts of methylene bis(4-cyclohexyl isocyanate), polyoxypropylene triols and diols and bis(2,2,6,6 tetramethyl piperidinyl-4) sebacate in the presence of an organotin catalyst. The respective quantities of diisocyanate and polyols and amine-containing stabilizer are adjusted so that the ratio of isocyanate groups (NCO) to the total of hydroxyl groups and amine groups is at least 1.5/1 and, preferably, about 2/1 or greater. The molecular weights and proportions of polyoxypropylene diols and higher functional polyols are balanced to provide a desired viscosity in the uncured prepolymer binder resin mixture and a desired hardness, toughness and flexibility in the cured paint. The amount of bis(2,2,6,6 tetramethyl piperidinyl-4) sebacate will normally be from 0.1% to about 2% of the resin.

In the formation of a prepolymer resin of this invention, the stabilizer, which contains two reactive amine groups, reacts with isocyanate groups such that the original stabilizer molecules are distributed and fixed throughout the prepolymer resin molecules. This is an important and unique feature of my binder resin. The stabilizer is chemically reacted into the resin, while maintaining its stabilizing properties, so that it can neither diffuse out of the final topcoat film nor undergo phase separation and aggregation.

Preferably, the stabilizer is added to the isocyanate-polyol mixture at the start of the prepolymer resin synthesis. The polyol and stabilizer molecules react in concurrent competitive reactions with the aliphatic isocyanate molecules or isocyanate terminated chains. However, if a sufficient excess of isocyanate is used in the initial isocyanate-polyol reaction mixture (e.g., NCO/OH greater than about 3 to 3.5), the stabilizer may be added to the reaction mixture after the polyol has been wholly or largely consumed in the prepolymer forming reaction. If sufficient reaction time is provided, the stabilizer completely reacts with isocyanate terminated prepolymer chains and unreacted aliphatic isocyanate molecules. In either technique the stabilizer is to be substantially completely reacted into the prepolymer chains. Moreover, because of the excess of isocyanate groups present, the amine hydrogens are entirely replaced during the formation of the prepolymer resin, thus protecting the stabilizer moieties from oxidation at a later time.

Merely physically blending a bis-hindered piperidinyl stabilizer or any other known stabilizer with a urethane prepolymer resin does not achieve the excellent gloss stability obtained with the subject stabilized prepolymer. There is a tendency for the stabilizer to migrate and cause loss of gloss. The chemical incorporation of the piperidinyl stabilizer in the aliphatic isocyanate based urethane prepolymer resin of this invention, while maintaining stabilizer capability, makes it possible to exploit the excellent physical properties of the polyether urethanes in automotive topcoat applications and other applications where there is prolonged outdoor or photo-oxidative exposure.

These and other objects and advantages of my invention will be better understood in view of a detailed description thereof which follows.

A few specific examples will help illustrate the invention.

EXAMPLE 1

Four resin mixtures were prepared designated, respectively, P96-1W through P96-4W. In each the following ingredients were utilized. Methylene bis(4-cyclohexyl isocyanate) obtained from E. I. duPont de Nemours & Company was employed. This diisocyanate is a liquid stereoisomeric mixture sold under the trade name of "Hylene W". The material is sometimes generically referred to as $H_{12}MDI$. Analysis showed it to be of greater than 99.2% purity. A polyoxypropylene diol was employed. It was obtained from BASF Wyandotte Corporation under the trade designation "P410" and had a hydroxyl number of 255. A polyoxypropylene triol based on trimethylol propane was also used. It was obtained from BASF Wyandotte Corporation under the trade designation "TP740". It had a hydroxyl number of 230. Also included in the reactive mixture of diisocyanate, diol and triol were varying amounts of bis(2,2,6,6 tetramethyl piperidinyl-4) sebacate

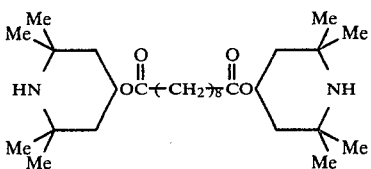

and dibutyltin dilaurate which was used as the catalyst.

In each of the paint formulations, 96-1W through 96-4W, the following amounts of diisocyanate diol, triol and catalyst were employed in the preparation of the isocyanate terminated prepolymer:

| Constituent | Parts By Weight | Milliequivalents |
| --- | --- | --- |
| Diisocyanate - Hylene W | 68.9 | 526 |
| Diol - P410 | 22.9 | 104 |
| Triol - TP740 | 8.8 | 37 |
| Catalyst | 0.05 | |

The ratio of NCO groups to OH groups is 3.7. In each sample, 96-1W through 96-4W, the above constituents were mixed with about 11 parts by weight of dry butyl acetate as solvent. Each uniform mixture was allowed to react four days at room temperature.

The four resin mixture samples were then each mixed with 15 grams of dry butyl acetate and the following pigments:

| Pigment | Supplier | Parts By Weight |
| --- | --- | --- |
| Titanium Dioxide, Zopaque R885 | Glidden-Durkee Division SCM Corporation | 18.6 |
| Carbon Black | Inmont Corporation | 0.006 |
| Ferric Yellow | Inmont Corporation | 0.042 |
| Indo Orange | Inmont Corporation | 0.001 |

The pigment to binder ratio was about 0.186:1 in each instance. The above mixture of pigments produces a white pigment and, as used herein, is henceforth designated "$TiO_2+$". Each of the pigment-resin paste mixtures was ground with 20-30 mesh Cera Media at 5400 linear feet/minute (3 inch nylon impeller) for thirty minutes until a 15 to 20 micron particle size dispersion was achieved. After removing the grinding media each mixture was diluted with 8 grams of dry methyl ethyl ketone and 9.5 grams of Cellosolve acetate (ethylene glycol monoethyl ether acetate) to spray viscosity. Additional dibutyltin dilaurate was added to each mixture until the catalyst concentration equaled 0.06% of the binder weight. To the pigmented prepolymer resins were also added the following amounts of bis(2,2,6,6 tetramethyl piperidinyl-4) sebacate:

| | Parts By Weight | Milliequivalents |
| --- | --- | --- |
| P96-1W | 0.1 | 0.4 |
| P96-2W | 0.5 | 2 |
| P96-3W | 1.0 | 4 |
| P96-4W | 2.0 | 8 |

Bis(2,2,6,6 tetramethyl piperidinyl-4) sebacate was obtained from Ciba-Geigy under the trade designation Tinuvin 770 ®. The ratio of NCO to the total of OH groups and amine groups for these samples is 3.5 to 3.7. The prepolymer, pigment and stabilizer mixtures were allowed to stand three days at room temperature to assure that the stabilizer was fully reacted with the prepolymer mixture. The new prepolymer mixture was still isocyanate terminated. Each prepolymer contained in its backbone the Tinuvin 770 stabilizer moiety, the stabilizer having reacted with isocyanate groups through its amine functionality.

Thus, four white, moisture curable polyurethane topcoat paints were prepared. The respective binders differed in concentration of stabilizer moiety but their overall compositions were approximately as follows:

| P96-1W Through P96-4W | Parts By Weight |
| --- | --- |
| Binder | 100 |
| Pigments | 19 |
| Solvents | |
| Methyl Ethyl Ketone | 8 |
| n-Butyl Acetate | 26 |
| Cellosolve | 9.5 |
| Spray Solids | 73.2% |
| Pigment Binder Ratio | 0.186:1 |
| Zahn 2 Cup Viscosity | 28.6 Seconds |

The four different paints differed only in bis-piperidinyl content. They were separately applied as white topcoats over Bonderite 40 phosphated steel substrates which had been primed with Inmont Corporation's lacquer primer/surfacer (U28AD025). The topcoats were spray applied using standard siphon fed spray guns. The coatings were cured for thirty minutes at 88° C. and 45% relative humidity in a Tenney-Mite 5 temperature/humidity chamber. The topcoat coatings were decorative and glossy and found to have excellent mechanical properties. They were tough, flexible and resistant to chipping and other mechanical failure. They were resistant to degradation under high humidity conditions. Furthermore, a most surprising and useful property of the coatings was their excellent gloss stability when exposed to ultraviolet radiation.

The initial 20° gloss (i.e., percent of a beam of incident light reflected at 20° to a plane perpendicular to the painted panel) was measured using a Hunter lab glossmeter. Readings were taken at five different locations on each panel and the average taken.

The initial 20° gloss values of the P96-1W through P96-4W topcoated specimens were in the range of 82.9 to 84.9. The specific values are found in Table I below.

The painted panels were then subjected to accelerated ultraviolet radiation aging tests in the General Motors Research Laboratories weatherometer. This device is a large cabinet in which the temperature and humidity can be controlled, and having an elongated base with two long opposing flat sides and opposing rounded ends. Ninety-five 180 watt RS-4 mercury vapor sunlamps are mounted over the whole of one flat wall and about two-thirds of the other flat wall. Topcoated panels to be tested are mounted on chain-driven racks movable alternately from lighted regions to dark regions. The painted panels are suspended vertically so that incident mercury vapor light shines directly on their surfaces. The panels are moved around such that during each cycle (requiring ten and one-half minutes) they are in darkness for four and one-half minutes, exposed to intense UV radiation for two minutes, again in darkness for one minute, and again exposed to UV radiation for three minutes. The total incident UV flux density per cycle is 24,400 microwatts per square centimeter.

The utility of the weatherometer is in obtaining accelerated testing with respect to the effects of ultraviolet radiation (simulating sunlight) and humidity on paints, plastics and other organic material. The correlation between hours of exposure to UV light in the weatherometer and months of exposure to sunlight varies with the material being tested. However, in general, those materials showing greater resistance in the weatherometer also have better resistance to sunlight.

The P96-1W through P96-4W urethane topcoated panels were tested in the General Motors weatherometer. The 20° gloss was measured at periods of about 100 UV hours (210 cycle hours in the weatherometer equals 100 UV exposure hours). In the table below is reported the initial 20° gloss reading for the respective topcoats, the percentage of the initial gloss remaining after exposure for 250, 500 and 1,000 UV hours, respectively, and the UV hours weatherometer exposure required to reduce the gloss to 90% and 50% of its initial value.

TABLE I
GLOSS STABILITY OF WHITE
MOISTURE CURING URETHANES

| Coating | Stabilizer Concentration$^a$ | Initial 20° Gloss | % Initial Gloss After | | | UV Hrs. Weatherometer Exposure at a Given % of the Initial Gloss | |
|---|---|---|---|---|---|---|---|
| | | | 250 UV Hrs. | 500 UV Hrs. | 1000 UV Hrs. | 90% | 50% |
| P96-1W | 0.1 | 83.1 | 68 | 59 | 55 | 60 | b |
| P96-2W | 0.5 | 84.9 | 90 | 80 | 77 | 210 | b |
| P96-3W | 1.0 | 83.9 | 100 | 94 | 89 | 980 | b |
| P96-4W | 2.0 | 82.9 | 100 | 100 | 95 | c | b |

$^a$Concentration is % of binder weight.
$^b$More than 50% initial gloss was retained after 1000 UV Hrs. when test ended.
$^c$More than 90% initial gloss was retained after 1000 UV Hrs. when test ended.

It is seen that all of the above topcoats were very resistant to ultraviolet radiation as demonstrated by their high gloss retention. Each sample retained more than 50% of its initial gloss even after exposure for 1,000 UV hours when the test ended. Sample P96-4W retained more than 90% of its initial gloss after 1,000 UV hours. This degree of gloss retention compares very favorably with presently available, commercial automotive, economic topcoat lacquers which typically retain 50% to 60% of their original gloss after 1,000 UV hours exposure in the weatherometer. However, the subject urethane topcoatings are much more flexible and resistant to chipping and other mechanical failures. Moreover, they are curable at significantly lower temperatures and appliable with lower solvent content than presently used automotive topcoat formulations.

EXAMPLE 2

This example illustrates how moisture curing urethane topcoat paints incorporating commercial stabilizers that have been simply mixed with the resin behave when subjected to ultraviolet radiation.

A moisture curable urethane prepolymer was prepared having the following constituents. Hylene W, methylene bis(4-cyclohexyl isocyanate) was employed. A polyoxypropylene diol supplied by Union Carbide Corporation under the trade designation "N1025" and having a hydroxyl number of 89.9 was used. A polyoxypropylene triol supplied by BASF Wyandotte Corporation under the trade designation "GP730" and having a hydroxyl number of 236 was used. The catalyst was dibutyltin dilaurate. These constituents were mixed together in the following proportions:

| Constituent | Parts By Weight | Milliequivalents |
|---|---|---|
| Diisocyanate - Hylene W | 51.0 | 390 |
| Diol - N1025 | 21.6 | 40 |
| Triol - GP730 | 27.0 | 115 |
| Catalyst | 0.02 | |

The ratio of NCO groups to OH groups was 2.5:1.

About 7.5 parts by weight of dry Cellosolve acetate was added to the reactive mixture which was allowed to react for several days at room temperature. Eighteen (18) parts by weight of titanium dioxide pigment was then milled into the resin to form a white topcoat formulation, designated "P48". The topcoat formulation was split into several portions to which was added, respectively, quantities of commercial stabilizers. The stabilizers were as follows:

| Stabilizer | Supplied By |
|---|---|
| Cyasorb UV 1988 (benzylidenemalonate) | American Cyanamide Company |
| Tinuvin P (benzotriazole) | Ciba Geigy Corporation |
| Cyasorb UV 3100 (salicylate) | American Cyanamide Company |
| Irganox 1010 (hindered phenol) | Ciba Geigy Corporation |

These stabilizers were individually added in increasing quantities from 0.1% to 1% of the binder content of the P48 paints. They did not react with the binder resin, but were simply physically mixed with it. These paints were applied to phosphated and primed panels as in Example 1 and the coatings cured thereon as described in that example. The coated panels were subjected to weatherometer testing as described, and the results summarized in the following table were obtained.

TABLE II
GLOSS STABILITY IN P48-W COATINGS

| Coating | Stabilizer (Class) | Conc. (%) | 20° Gloss Initial | 20° Gloss 50 UV Hr. | % Initial Retained |
|---|---|---|---|---|---|
| P48-W1-A | Cyasorb 1988 (Benzylidene-malonate) | 0.1 | 76 | 11 | 14 |
| B | | 0.2 | 78 | 14 | 18 |
| C | | 0.5 | 79 | 24 | 30 |
| D | | 1.0 | 76 | 44 | 58 |
| P48-W2-A | Tinuvin P (Benzotriazole) | 0.1 | 75 | 36 | 44 |
| B | | 0.2 | 79 | 25 | 32 |
| C | | 0.5 | 79 | 16 | 21 |
| D | | 1.0 | 80 | 24 | 31 |
| P48-W3-A | Cyasorb UV3100 (Salicylate) | 0.1 | 79 | 8 | 10 |
| B | | 0.2 | 80 | 29 | 36 |
| C | | 0.5 | 81 | 12 | 15 |
| D | | 1.0 | 78 | 18 | 24 |
| P48-W4-A | Irganox 1010 (Hindered Phenol) | 0.1 | 81 | 14 | 17 |
| B | | 0.2 | 80 | 28 | 35 |
| C | | 0.5 | 76 | 19 | 25 |
| D | | 1.0 | 72 | 16 | 21 |
| P48-W | None (Control) | | 77 | 17 | 22 |

It is seen that none of the above commercial UV stabilizers were effective in increasing the gloss stability of the subject urethane topcoats. In each case, even at stabilizer concentrations as high as 1%, most of the initial 20° gloss had been lost after an exposure of only 50 UV hours. This example summarizes the experience of the art in that known UV stabilizers are not effective in improving the durability of moisture curable urethane coatings against exposure to ultraviolet radiation.

EXAMPLE 3

In other work with urethane topcoat formulations of the type heretofore described it was discovered that bis(2,2,6,6 tetramethyl piperidinyl-4) sebacate (Tinuvin 770, Ciba Geigy Corporation) was a more effective gloss stabilizer than other commercial stabilizers when simply physically mixed with (but not reacted with) moisture curing urethane topcoats. For example, topcoat formulation P68-1W was prepared from the following constituents:

|  |  | Parts By Weight | Milli-equivalents |
|---|---|---|---|
| Binder |  |  |  |
| Diisocyanate | Hylene W | 53.0 | 405 |
| Diol | N1025 | 15.6 | 29 |
| Triol | GP730 | 31.3 | 133 |
| Catalyst | Dibutyltin Dilaurate | 0.053 |  |
| Pigment | Zopaque R885 TiO₂ | 18.6 |  |
|  | Carbon Black | 0.006 |  |
|  | Ferric Yellow | 0.042 |  |
|  | Indo Orange | 0.001 |  |
| Solvents | Methyl Ethyl Ketone | As Needed |  |
|  | Butyl Acetate | As Needed |  |
|  | Cellosolve Acetate | As Needed |  |

The ratio of NCO groups to OH groups was 2.5:1.

This binder resin is similar to that prepared in Example 2. After the binder prepolymer, solvent and pigment were milled together, the paint was mixed with a small amount of additional catalyst and with 0.19 phr Irganox 1010 and 1.6 phr Tinuvin 770. The paint was sprayed on phosphated and primed steel panels the same day and cured at 190° F. (88° C.) and 50% relative humidity for thirty minutes.

The initial 20° gloss of cured topcoats of this formulation was 80.3. A number of panels were subjected to weatherometer testing. The gloss was only reduced to 90% of its initial value after 310 UV hours weatherometer exposure, and to 50% of its initial gloss after 475 UV hours weatherometer exposure. Other tests demonstrated that the Irganox 1010 made no contribution to the improvement in gloss stability. Thus it was determined that simply mixing in the Tinuvin 770 with the subject family of urethane prepolymer topcoat binder resins markedly increased the UV stability as compared to urethane resins stabilized with other mixed-in stabilizers (see Example 2). However, even this improved stability is not comparable to that demonstrated by commercially acceptable acrylic and other automotive topcoat paints.

EXAMPLE 4

In this and the following example, subject paint formulations are illustrated in which the tetramethyl piperidinyl stabilizer is added to the mixture of polyols and isocyanate at the beginning of the prepolymer synthesis. The following series of P111 and P115 paint formulations were prepared:

|  | P111 | | P115 | |
|---|---|---|---|---|
| Constituent | Parts By Weight | Milli-equivalents | Parts By Weight | Milli-equivalents |
| Diisocyanate - Hylene W | 64.3 | 491 | 63.9 | 488 |
| Diol - P410 (BASF Wyandotte) | 28.2 | 128 | 17.9 | 81 |
| Triol - TP440 (BASF Wyandotte) | 0.74 | 35 | — | — |
| Triol - TP740 (BASF Wyandotte) | 6.8 |  | 18.2 | 81 |
| Catayst - Dibutyltin Dilaurate | 0.02 |  | 0.02 |  |
| Stabilizer - Tinuvin 770 | 1.0 | 4 | 1.0 | 4 |

The ratio of NCO groups to the total of hydroxyl groups and piperidinyl amine groups was about 2.9:1 in both P111 and P115. In each sample the diisocyanate, the polyols, catalyst and stabilizer were all mixed with butyl acetate and allowed to react roughly one week at room temperature.

17.6 parts by weight of TiO₂+ was milled into each binder resin until a 12 micron particle size was obtained in each instance. The paint was then let down to its final spray viscosity with methyl ethyl ketone and Cellosolve acetate until the compositions summarized below were obtained. The dibutyltin dilaurate content was adjusted to 0.05% by weight of the resin.

| Constituents | P111 Parts By Weight | P115 Parts By Weight |
|---|---|---|
| Binder | 100 | 100 |
| Pigments (TiO₂+) | 17.6 | 17.6 |
| Solvents |  |  |
| Methyl Ethyl Ketone | 18.3 | 24.8 |
| n-Butyl Acetate | 17.7 | 13.9 |
| Cellosolve Acetate | 10.3 | 9.3 |
| Spray Solids | 71.8% | 71.0% |
| Pigment Binder Ratio | 0.176:1 | 0.176:1 |
| Zahn 2 Cup Viscosity | 24.8 Seconds | 27.6 Seconds |

Just prior to application of these paints, 1% of Tinuvin P (benzotriazole) stabilizer (based on the weight of the binder resin) was mixed into each formulation based on the amount of the resin mixed into the formulation. The two paints were sprayed separately onto phosphated and primed (as in Example 1) steel panels. The panels were heated for thirty minutes at 190° F. and 50% relative humidity to cure the respective topcoats.

The panels were subjected to GMR weatherometer testing as described in connection with Example 1 with the following results.

TABLE III

| Coating | Initial 20° gloss | % Initial Gloss After 250 UV Hrs. | 500 UV Hrs. | 1000 UV Hrs. | UV Hrs. Weatherometer Exposure at a Given % of the Initial Gloss 90% | 50% |
|---|---|---|---|---|---|---|
| P111 | 84.1 | 95 | 84 | 71 | 325 | >1000 Hrs.$^a$ |
| P115 | 84.2 | 86 | 68 | 60 | 210 | >1000 Hrs.$^a$ |

$^a$More than 50% initial gloss was retained after 1,000 UV hours when test ended.

It is seen that both the P111 and P115 topcoats displayed excellent gloss stability. Both stabilized moisture curing urethane topcoat materials retained more than 50% of their initial 20° gloss after 1,000 UV hours exposure in the GMR weatherometer, at which time the test was ended. These materials contained bis(2,2,6,6 tetramethyl piperidinyl-4) sebacate reacted into the paint binder resin molecules and Tinuvin P stabilizer simply physically mixed with the paint prior to painting. However, as seen in Example 2 the Tinuvin P stabilizer is not effective in stabilizing the subject moisture curing urethane coatings against UV radiation. In this example it was the tetramethyl piperidinyl stabilizer coreacted into the prepolymer binder molecules that produced the excellent UV stability. It is also noted that the UV stability of the P111 and P115 formulations are comparable to the bis-tetramethyl piperidinyl stabilized P96 formulation described in Example 1 and superior to the stability of the P68 formulation of Example 3, to which the tetramethyl piperidinyl stabilizer was simply physically mixed just prior to spraying.

EXAMPLE 5

A white stabilized paint and a blue metallic stabilized paint in accordance with the subject invention were prepared and tested for gloss stability.

The stabilized isocyanate terminated prepolymer was prepared by mixing the following materials in the weight proportions indicated:

| Constituent | Parts By Weight | Milliequivalents |
|---|---|---|
| Isocyanate - Hylene W | 59.4 | 454 |
| Diol - P1010 (BASF Wyandotte Corp.) | 17.4 | 33 |
| Triol - TP440 (BASF Wyandotte Corp.) | 14.3 | 118 |
| Triol - TP1540 (BASF Wyandotte Corp.) | 8.8 | |
| Stabilizer - Tinuvin 770 | 1.0 | 4 |
| Dibutyltin Dilaurate | 0.02 | |
| n-Butyl Acetate | 4.16 | |
| Cellosolve Acetate | 4.16 | |

The ratio of NCO groups to the total of OH groups and amine groups was about 2.9:1.

The catalyzed isocyanate-polyol-piperidinyl stabilizer mixture was allowed to react one week at room temperature. The progress of the reaction was followed by measuring the viscosity of the reaction mixture from time to time and it was noted that the reaction was substantially complete after twenty-four hours.

Portions of this binder resin mixture were then used to make a white paint and a blue metallic paint as follows.

White Paint

A portion of the above prepolymer resin binder was milled with the $TiO_2+$ pigment mixture and solvent in the following proportions:

| | Parts By Weight |
|---|---|
| Binder | 100 |
| $TiO_2+$ | 80 |
| Cellosolve Acetate | 13 |
| n-Butyl Acetate | 13 |

The milling was continued until a 15 micron particle size was obtained. More of the prepolymer binder mixture, catalyst and solvent mixture was then added to the milled mixture to produce a white moisture curing urethane paint of the following composition:

| | Parts By Weight |
|---|---|
| Binder | 100 |
| $TiO_2+$ | 40 |
| Methyl Ethyl Ketone | 41 |
| n-Butyl Acetate | 22 |
| Cellosolve Acetate | 10.7 |
| Dibutyltin Dilaurate | 0.06 |
| Spray Solids | 65% |
| Pigment Binder Ratio | 0.4:1 |
| Zahn 2 Cup Viscosity | 29.4 Seconds |

Metallic Blue Paint

A quantity of the above specified urethane prepolymer binder mixture was milled with phthaloblue (duPont) pigment and solvent in the following proportions:

| | Parts By Weight |
|---|---|
| Binder | 77 |
| Phthaloblue | 75 |
| n-Butyl Acetate | 3.5 |
| Cellosolve Acetate | 3.5 |

The milling was continued until a pigment particle size under 20 microns was obtained. A part of this mill paste was then mixed with additional urethane prepolymer binder resin and solvent to obtain the following formulation:

| | Parts By Weight |
|---|---|
| Binder | 100 |
| Phthaloblue | 2.5 |
| Cellosolve Acetate | 8.5 |
| n-Butyl Acetate | 8.5 |
| Methyl Ethyl Ketone | 17.1 |

To the above blue pigmented formulation was added a mixture of coarse aluminum flake, solvent and urethane prepolymer binder and additional catalyst until a blue metallic moisture curing urethane paint of the following composition was obtained:

| | Parts By Weight |
|---|---|
| Binder | 100 |
| Phthaloblue | 0.5 |
| Aluminum Flake | 1.5 |
| Methyl Ethyl Ketone | 34 |
| n-Butyl Acetate | 17 |
| Cellosolve Acetate | 17 |
| Catalyst | 0.06 |
| Spray Solids | 60% |
| Pigment Binder Ratio | 2.1:100 |
| Zahn 2 Cup Viscosity | 27.6 Seconds |

A number of Bonderite 40 phosphated and U2-8AD025 primed steel panels were painted with the above white and blue metallic urethane paints. A number of other panels were also topcoated with present commercial acrylic white and acrylic blue metallic paints. The acrylic coated panels were baked in accordance with conventional practice. The subject moisture curing urethane topcoated panels were cured in accordance with one of the following bake cycles:

| Bake Cycle | Dry Bulb Temperature (°F.) | Relative Humidity (%) |
|---|---|---|
| 1 | 210 | 31 |
| 2 | 190 | 55 |
| 3 | 190 | 45 |
| 4 | 190 | 37 |
| 5 | 170 | 67 |

A given moisture curing urethane topcoated panel was subjected to one of the above bake cycles for thirty minutes. The panels were then subjected to accelerated exposure to ultraviolet radiation in a QUV Accelerated Weathering Tester sold by Q Panel Corporation. In this device the panels are subjected to eight hours of high intensity ultraviolet radiation from FS40 sunlamps at 160° F. followed by four hours exposure to condensing humidity at 120° F. with no ultraviolet radiation. This accelerated testing program is believed to be more severe than that carried out in the GMR weatherometer.

The following results were obtained in the accelerated QUV testing procedure:

| Panel Color | Bake Cycle | 20° Gloss Ultraviolet Exposure (Hours) | | | | | |
|---|---|---|---|---|---|---|---|
| | | Initial | 112 | 224 | 336 | 448 | 560 |
| Urethane White | 1 | 82 | 79 | 68 | 65 | 61 | 47 |
| Urethane White | 2 | 82 | 75 | 69 | 63 | 59 | 50 |
| Urethane White | 3 | 81 | 73 | 63 | 59 | 56 | 49 |
| Urethane White | 4 | 82 | 67 | 60 | 55 | 53 | 46 |
| Urethane White | 5 | 81 | 76 | 68 | 60 | 53 | |
| Arcylic White | — | 78 | 66 | 48 | 39 | 33 | 26 |
| Urethane Blue Metallic | 1 | 81 | 73 | 71 | 58 | 51 | 42 |
| Urethane Blue Metallic | 2 | 83 | 77 | 71 | 60 | 50 | 34 |
| Urethane Blue Metallic | 3 | 83 | 70 | 68 | 56 | 49 | 31 |
| Urethane Blue Metallic | 4 | 82 | 73 | 67 | 55 | 46 | 35 |
| Urethane Blue Metallic Acrylic | 5 | 83 | 80 | 73 | 62 | 55 | 41 |
| Blue Metallic | — | 81 | 57 | 13 | 3 | — | — |

It is seen that all of the subject urethane white and blue metallic coatings had markedly better gloss stability than the acrylic white and blue metallic topcoats tested for comparison. All of the white and two blue urethane topcoats retained about 50% or more of their initial gloss even after 560 hours of severe ultraviolet radiation.

This example and Examples 1 and 4 illustrate the excellent gloss stability obtained in paint formulations employing the subject stabilized isocyanate terminated polyether urethane prepolymer resin mixtures. In addition to gloss stability, the subject cured paint films also have excellent physical properties for a topcoat paint. They are particularly tough, hard and flexible and, therefore, resistant to mechanical failure such as chipping.

In summary, it has been found that in order to produce moisture curing polyurethane automotive topcoats with satisfactory gloss stability, it is necessary to employ a light, stable, aliphatic isocyanate, e.g., methylene bis(4-cyclohexyl isocyanate), as the isocyanate constituent in the topcoat binder resin. Other aliphatic isocyanates include isophorone diisocyanate, lysine diisocyanate and the biuret of hexamethylene diisocyanate. Moreover and of most significance, a hindered bis-piperidinyl stabilizer, such as bis(2,2,6,6 tetramethyl piperidinyl-4) sebacate, must be incorporated with such isocyanate and the polyoxypropylene polyol constituents during the preparation of the moisture curable isocyanate terminated urethane prepolymer resin. The aforementioned piperidinyl sebacate is preferred. However, it is known that certain other bis-piperidinyl esters of aliphatic dicarboxylic acids are light stabilizers. They also may be employed in the subject urethane prepolymers. It will also be appreciated that while methyl groups are employed as the hindering groups in the preferred stabilizer, other lower alkyl groups may be substituted providing the bis-piperidinyl compound can still be reacted with isocyanate groups. The hindered piperidine reacts with isocyanate groups so that the stabilizer molecule (or moiety) is incorporated into the prepolymer resin backbone. It is distributed in the prepolymer molecule and bound therein so that the stabilizer cannot separate from the binder resin to be stabilized. It is the complete reaction of such hindered piperidines with the light, stable, aliphatic isocyanate prior to application and curing of the paint that leads to the formation of the light, stable topcoat paints of this invention. It should be noted that incorporation of the stabilizer in this manner insures that it is dispersed homogeneously throughout the coating and that it remains so dispersed on aging of the coating.

In the preparation of the subject binder resin prepolymer it is preferred that a mixture of polyoxypropylene diols with higher functional polyoxypropylene polyols be used. However, other alkylene diols and polyols and polyoxyalkylene diols and polyols, e.g., tetramethylene diol and polyoxyethylene glycols and polyols, may be used. Obviously, a significant proportion of triols or tetrols, or the like, must be used to provide chain branching and ultimately cross-linking so that a suitably tough, flexible, chip resistant paint is obtained. However, sufficient diol should be used so that the prepolymer does not gel and so that it can accommodate relatively high pigment loadings with a minimum of solvent and still be applied to a substrate. In the practice of my invention, as contemplated for automobile topcoat compositions, it is preferred that the ratio of total isocyanate groups to the total of hydroxyl groups, plus the relatively small amount of amine groups in the hindered piperidine stabilizer, be 1.5:1 or greater. It is particularly preferred that this ratio be in the range of about 2:1 to 3:1. This excess of isocyanate groups provides for good incorporation of the stabilizer moiety into the prepolymer resin. It also provides a sufficient concentration of isocyanate groups in the paint for reaction with ambient water to facilitate rapid and efficient moisture cure of the topcoat paint after it has been applied to a desired substrate. Polyoxypropylene diols having molecular weights in the range of about 200 to 4,000 may be used. Polyoxypropylene triols or higher functional polyols with molecular weights in the range of 400 to 4,000 are suitable. The ratio of the equivalents of triol (or higher polyols) to total hydroxyl may be in the range of 0.1 to 0.9.

As is known, the formation of the urethane prepolymer resin is accelerated by using a small amount of an organotin catalyst, such as dibutyltin dilaurate. With the use of about 0.02% up to 0.2% of such catalyst based on the weight of the resin forming constituents, the isocyanate, stabilizer and polyols can simply be mixed at room temperature and allowed to react over a period of a day or so to form the isocyanate terminated prepolymer. A small amount of dry solvent, such as Cellosolve acetate, butyl acetate or methyl ethyl ketone, may optionally be used during the prepolymer resin preparation. Other solvents may be used as long as they do not react with the isocyanate and are compatible with the polymers. The prepolymer resin then contains isocyanate terminated polyether urethane chains containing stabilizer moieties. The mixture also contains some unreacted diisocyanate which will become incorporated in the binder molecule upon moisture curing.

After the binder resin has been formed as described, it can be mixed with suitable pigments, including metal flake, to form desired topcoat compositions. Other paint additives may be added. The paint can be formulated with exempt solvents (California Rule 66), such as those mentioned above or other solvents, subject to the limitations specified above. Depending upon the viscosity of the binder resin, a high solids content paint can be formulated having at least 60% or 70% solids (i.e., pigment plus binder) at the time of spraying. This minimizes the quantity of solvents that must be evaporated during paint drying and permits lower drying temperatures in the paint curing ovens.

While my invention has been described in terms of certain specific embodiments thereof, it will be appreciated that other forms could readily be adapted by those skilled in the art and, accordingly, the scope of my invention is to be considered limited only by the following claims.

I claim:

1. A paint composition characterized by the ability to provide a cured finish over a base material, the finish being gloss stable when exposed to ultraviolet radiation, said paint comprising as a binder resin an aliphatic isocyanate terminated polyurethane prepolymer containing chemically incorporated in the molecular chains thereof a bis-2,2,6,6 tetraalkyl group hindered piperidinyl ester of an aliphatic dicarboxylic acid ultraviolet stabilizer, the stabilizer thus being distributed uniformly throughout said paint composition and prevented from separating from said binder.

2. A paint composition characterized by the ability to provide a moisture cured finish over a base material, the finish being gloss stable when exposed to ultraviolet radiation, said paint comprising as a binder resin an aliphatic isocyanate terminated, polyether polyurethane prepolymer containing chemically incorporated in the molecular chains thereof a bis-2,2,6,6 tetramethyl piperidinyl ester of an aliphatic dicarboxylic acid ultraviolet stabilizer, the stabilizer thus being distributed uniformly throughout said paint composition and prevented from separating from said binder.

3. A moisture curable ultraviolet stabilized isocyanate terminated urethane prepolymer reaction product of an aliphatic polyfunctional isocyanate, a mixture of one or more organic diols with one or more organic polyols having a hydroxyl functionality of three or greater, said diol and polyol being selected from the group consisting of alkylene diols, polyoxyalkylene diols, alkylene polyols and polyoxyalkylene polyols, and a bis-2,2,6,6 tetraalkyl group hindered piperidinyl ester of an aliphatic dicarboxylic acid, the proportions of said isocyanate, diol, polyol and piperidinyl ester being such that said prepolymer is isocyanate terminated and not gelled, the said piperidinyl ester being incorporated during said reaction into the molecular chains of said prepolymer and affording the prepolymer in its cured condition with gloss stability when it is exposed to ultraviolet radiation.

4. A moisture curable ultraviolet stabilized isocyanate terminated polyether urethane prepolymer containing paint binder resin composition which is the reaction product of an aliphatic diisocyanate, a polyoxypropylene diol, a polyoxypropylene polyol having a hydroxyl functionality of three or greater and a bis-2,2,6,6 tetramethyl piperidinyl ester of an aliphatic dicarboxylic acid in the presence of a catalyst, the amounts of said isocyanate, diol, polyol and piperidinyl ester being such that there is at least about a fifty percent excess of isocyanate groups with respect to the total of hydroxyl groups and amine groups, the said piperidinyl ester being incorporated by said reaction into the molecular chains of said prepolymer and providing the prepolymer in its cured condition with gloss stability when it is exposed to ultraviolet radiation.

5. A moisture curable ultraviolet stabilized isocyanate terminated polyether urethane prepolymer containing paint binder resin composition which is the reaction product of methylene bis(4-cyclohexyl isocyanate), a polyoxypropylene diol, a polyoxypropylene polyol having a functionality of three or greater and bis(2,2,6,6 tetramethyl piperidinyl-4) sebacate in the presence of a catalyst, the ratio of NCO groups to the total of hydroxyl groups and amine groups being at least 1.5, said bis-piperidinyl sebacate being chemically reacted into the molecules of said prepolymer and providing the cured prepolymer with gloss stability when it is exposed to ultraviolet radiation.

* * * * *

UNITED STATES PATENT AND TRADEMARK OFFICE
CERTIFICATE OF CORRECTION

PATENT NO. : 4,243,792
DATED : January 6, 1981
INVENTOR(S) : William T. Short

It is certified that error appears in the above-identified patent and that said Letters Patent are hereby corrected as shown below:

An error appears in the chart in column 11, line 30. The last three columns of "Ultraviolet Exposure" for "Acrylic White Bake Cycle 5" are incorrect. The chart should read as follows:

| Panel Color | Bake Cycle | Initial | 112 | 224 | 336 | 448 | 560 |
|---|---|---|---|---|---|---|---|
| Urethane White | 1 | 82 | 79 | 68 | 65 | 61 | 47 |
| " " | 2 | 82 | 75 | 69 | 63 | 59 | 50 |
| " " | 3 | 81 | 73 | 63 | 59 | 56 | 49 |
| " " | 4 | 82 | 67 | 60 | 55 | 53 | 46 |
| " " | 5 | 81 | 76 | 68 | 63 | 60 | 53 |
| Acrylic White | - | 78 | 66 | 48 | 39 | 33 | 26 |
| Urethane Blue Metallic | 1 | 81 | 73 | 71 | 58 | 51 | 42 |
| " " " | 2 | 83 | 77 | 71 | 60 | 50 | 34 |
| " " " | 3 | 83 | 70 | 68 | 56 | 49 | 31 |
| " " " | 4 | 82 | 73 | 67 | 55 | 46 | 35 |
| " " " | 5 | 83 | 80 | 73 | 62 | 55 | 41 |
| Acrylic Blue Metallic | - | 81 | 57 | 13 | 3 | -- | -- |

(20° Gloss, Ultraviolet Exposure (Hours))

Signed and Sealed this

Fifth Day of May 1981

[SEAL]

Attest:

RENE D. TEGTMEYER

Attesting Officer    Acting Commissioner of Patents and Trademarks